(12) United States Patent
Kao

(10) Patent No.: US 6,827,461 B2
(45) Date of Patent: Dec. 7, 2004

(54) BACKLIGHT MODULE

(75) Inventor: Hung-Chen Kao, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 10/278,344

(22) Filed: Oct. 23, 2002

(65) Prior Publication Data

US 2003/0137822 A1 Jul. 24, 2003

(30) Foreign Application Priority Data

Jan. 24, 2002 (TW) .................................. 91200696 U

(51) Int. Cl.⁷ .......................................... G02F 1/1335
(52) U.S. Cl. ........................ 362/31; 362/561; 349/58
(58) Field of Search ....................... 362/31, 551, 558, 362/26, 561; 349/58, 65, 60

(56) References Cited

U.S. PATENT DOCUMENTS 5,988,827 A * 11/1999 Lee ............................ 362/31
6,512,557 B1 * 1/2003 Miwa ......................... 349/58
6,561,664 B2 * 5/2003 Yachi et al. ................. 362/31
2002/0093811 A1 * 7/2002 Chen ........................... 362/31

FOREIGN PATENT DOCUMENTS

| JP | 2002006142 A | * | 1/2002 | ............ G02B/6/00 |
| JP | 2003168311 A | * | 6/2003 | ............ F21V/8/00 |
| KR | 2001045036 A | * | 6/2001 | ......... G02F/1/1335 |
| KR | 2002000353 A | * | 1/2002 | ............ G02F/1/133 |

* cited by examiner

Primary Examiner—Thomas M. Sember
Assistant Examiner—Hargobind S. Sawhney
(74) Attorney, Agent, or Firm—Thomas, Kayden, Horstemeyer & Risley

(57) ABSTRACT

A backlight module. The backlight module comprises a hollow frame and a light guide plate. The hollow frame includes a protrusion that projects inwardly. The light guide plate, including a concave portion, is disposed in the hollow frame in a manner such that the protrusion engages with the concave portion.

9 Claims, 10 Drawing Sheets

BACKLIGHT MODULE

BACKGROUND OF THE INVENTION

1. Field of the Invention

The invention relates to a backlight module; in particular, a backlight module that can maintain its image quality after a shock.

2. Description of the Related Art

Liquid crystal displays (LCDs) are gaining popularity for use in systems such as television receivers, computer monitors, avionics displays, aerospace displays, and other military-related displays where the elimination of cathode ray tube (CRT) technology is desirable for several reasons. In particular, CRTs are characterized by large depth dimensions, undesirable weight, and fragility. Additionally, CRTs require a relatively high voltage power supply in order to sufficiently accelerate electron beams for displaying images.

In general, LCD devices have various advantages in comparison with CRT display devices in that they are thin and low in power consumption, etc. Therefore, such LCD devices might be expected to be substituted for CRT display devices and have been a matter of great interest in some industry fields.

In contrast to the CRT, the liquid crystal display device requires a light source, because the liquid crystal is not a fluorescent material. A cold cathode fluorescent lamp (CCFL), a hot cathode fluorescent lamp (HCFL) or the like is used as the light source of the liquid crystal display device. The lamp is included in a backlight unit of the liquid crystal display device. Backlight units are classified into direct back light type (or direct type) units and edge light type (or edge type) units, according to a position of the lamp.

In the case where the direct type backlight unit is used, incident rays from a lamp are directly incident to a liquid crystal display panel after a diffusion sheet uniformly diffuses the incident rays. In the case where the edge type backlight unit is used, rays from a lamp are incident to a liquid crystal display panel via a light guide plate. A detailed explanation of the edge type will be provided subsequently.

The edge type back light module generally includes a lamp, a light guide plate on a side surface of the lamp, a diffusion sheet on the top surface of the light guide plate, and a reflection sheet on the bottom surface of the light guide plate. The light guide plate uniformly scatters rays from the lamp such that rays are uniformly incident to the diffusion sheet. The reflection sheet reflects rays directed opposite the diffusion sheet such that most of the rays from the lamp are incident on the diffusion sheet. The diffusion sheet diffuses the rays to provide a uniform luminance throughout a light exit surface of the diffusion sheet. Additionally, a set of two prism sheets is beneficially disposed on the light exit surface of the diffusion sheet. The prism sheet set selectively changes the light rays as they pass through the sheets such that the luminance is enhanced at a particular viewing angle range. The rays from the prism sheet set are incident to the liquid crystal display panel of the liquid crystal display device such that images are displayed.

FIG. 1 is a partial cross-section of a conventional backlight unit 10. As stated above, a light guide plate 11 uniformly scatters rays from a cold cathode fluorescent lamp 12 such that rays are uniformly incident to the diffusion sheet (not shown). Thus, the light guide plate 11 is an element nearest to the cold cathode fluorescent lamp 12 in the backlight unit 10.

A Shock is an important reliability measure for LCDs. After the shock test, the structure of the LCD cannot be deformed seriously so that the light guide plate can be fixed to an original position in the LCD, and the backlight unit can maintain its image quality.

A frame of the liquid crystal display device supports the backlight unit including the above-mentioned sheets and lamp such that the liquid crystal display panel and backlight unit are fixed in a fixing structure. However, as the liquid crystal display device becomes thinner and thinner, the fixing or supporting structure of the above-mentioned backlight unit including the light guide plate et al. becomes more difficult to design. That is, space for fixing the backlight unit is so limited that a merely normal impact may break the fixing structure of the backlight unit.

FIG. 2a shows a conventional frame 22 supporting a light guide plate 21 of a conventional backlight unit. It is noted that the backlight unit has the light guide plate 21, and the frame 22 constitute the backlight module 20. As shown in FIG. 2b and FIG. 2c, the light guide plate 21 includes a protrusion 211, and the frame 22 includes a concave portion 221. By the protrusion 211 engaging with the concave portion 221, the light guide plate 21 is fixed to the frame 22. Generally, at the right side of the light guide plate 21 and the frame 22, the protrusion 211 and the concave portion 221 can be formed at any position except the position for screws (not shown). However, at the left side of the light guide plate 21 and the frame 22, except the position for screws, Y-TAB gate drivers (not shown) are also disposed. Thus, the protrusion 211 and the concave portion 221 can only be formed in positions without screws and gate drivers. It is noted that since the number of gate drivers is three to five, the space for the protrusion becomes smaller. Normally, the protrusion 211 can be only formed at the left-bottom corner of the light guide plate 21. Thus, the protrusion 211 of the light guide plate 21 is very small. During the shock, the contact area between the protrusion 211 and the concave portion 221 is also very small. As a result, the light guide plate 21 cannot resist the shock and can be broken, and the image quality of the backlight module is thus deteriorated. Furthermore, some of the light guide plates are totally damaged and moved so as to collide with the lamp; therefore, the lamp is also broken so as to not perform properly as the light source.

FIG. 3 shows another conventional frame 32 supporting another conventional light guide plate 31. As shown in FIG. 3, in such conventional backlight module 30, the light guide plate 31 is provided with two notches 311 at its bottom. The frame 32 is provided with two protrusions 321 corresponding to the notches 311 so as to prevent the light guide plate 31 from moving. By the protrusions 321 holding the notches 311, the light guide plate 31 can be prevented from breaking so that the lamp is not broken. However, since the light guide plate 31 linearly contacts with the frame 32, the light guide plate 31 may generate a crack 50 during the shock test. Such crack 50 may affect the image quality of the backlight module.

It is understood that in some backlight module, the light guide plate is adhered to the reflection sheet and then the reflection sheet is adhered to the frame. Such light guide plate is not provided with protrusions. Since the adhesive is disposed between the light guide plate and the frame, it may affect the image quality of the backlight module at high temperatures.

It is noted that the light guide plate 21, 31 is simply positioned in the frame 22, 32, and is not fixed therein. However, after the whole backlight module is assembled, the light guide plate is immobilized by the presence of other elements well known by those skilled in the art, thus description is omitted.

SUMMARY OF THE INVENTION

In order to address the disadvantages of the aforementioned backlight module, the invention provides a backlight module that can maintain image quality after a shock.

Another purpose of this invention is to provide a backlight module with a frame and a light guide plate stably disposed in the frame.

Accordingly, the invention provides a backlight module comprising a hollow frame and a light guide plate. The hollow frame includes a first protrusion that projects inwardly inside the hollow frame. The light guide plate, including a concave portion at a side of the light guide plate corresponding to the first protrusion, is disposed in the hollow frame in a manner such that the first protrusion engages with the concave portion.

In a preferred embodiment, the light guide plate further includes a second protrusion at the side, and the second protrusion is substantially longer than a quarter of a length of the side.

Furthermore, the length of the second protrusion may be substantially equal to half of the length of the side.

In another preferred embodiment, the light guide plate includes a curved surface connecting the second protrusion and the concave portion.

Furthermore, a tangent of the curved surface intersects the frame at an angle substantially less than forty-five degrees.

It is understood that corners of the second protrusion may be rounded, and the frame may be made of plastic.

In another preferred embodiment, this invention provides a backlight module. The backlight module comprises a hollow frame and a light guide plate. The hollow frame includes a concave portion. The light guide plate, including a protrusion at a side of the light guide plate, is disposed in the hollow frame in a manner such that the protrusion engages with the concave portion.

BRIEF DESCRIPTION OF THE DRAWINGS

The invention is hereinafter described in detail with reference to the accompanying drawings in which:

FIG. 2b is an enlarged view of a part B in FIG. 2a;

FIG. 2c is an enlarged view of a part C in FIG. 2a;

FIG. 4b is an enlarged view of a part B in FIG. 4a;

FIG. 4c is an enlarged view of a part C in FIG. 4a;

FIG. 4d is an enlarged view of a part D in FIG. 4a; and

FIG. 4e is an enlarged view of a part E in FIG. 4a.

DETAILED DESCRIPTION OF THE INVENTION

Figure 1:
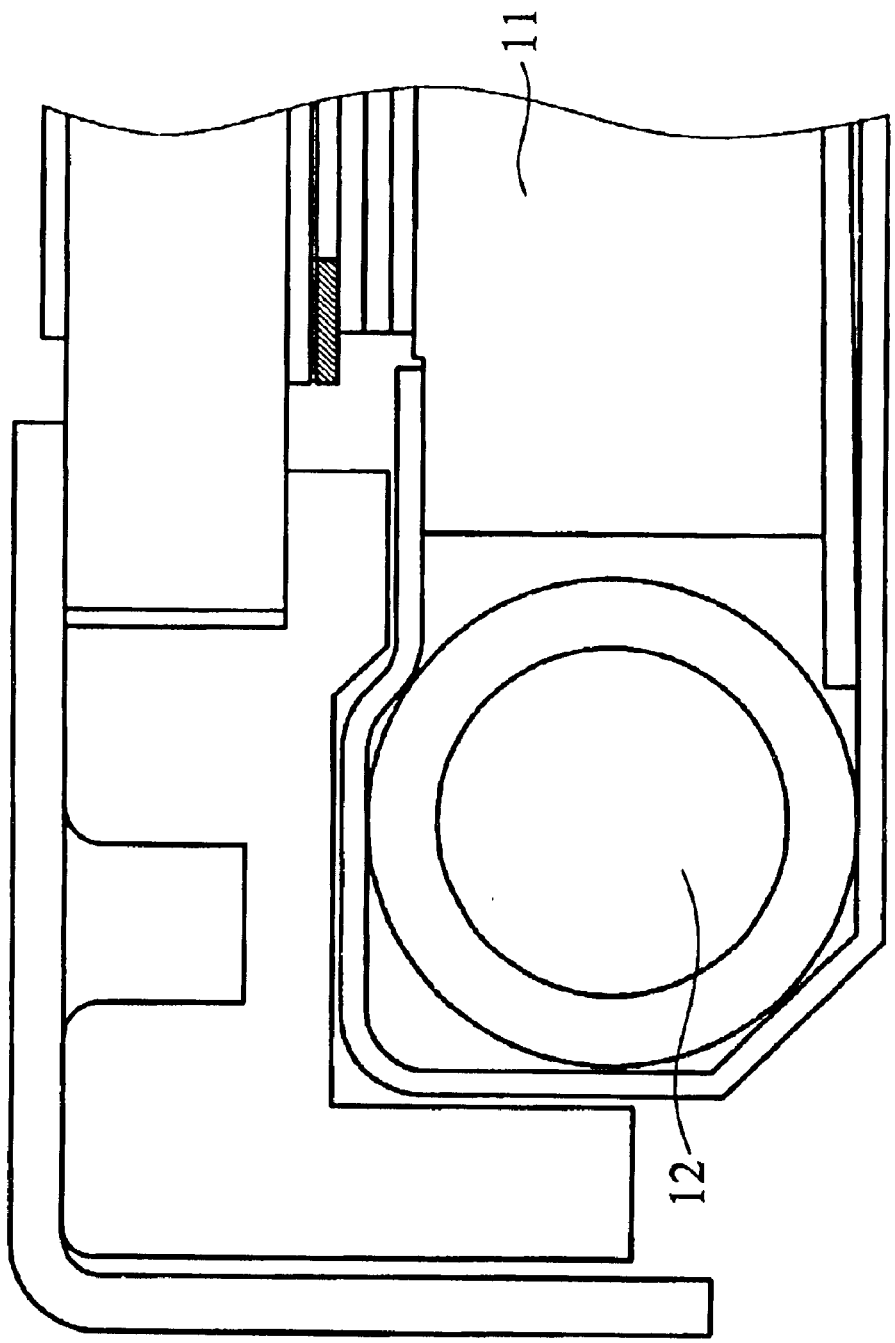
FIG. 1 is a partial cross section of a conventional backlight unit.
Figure 2A:
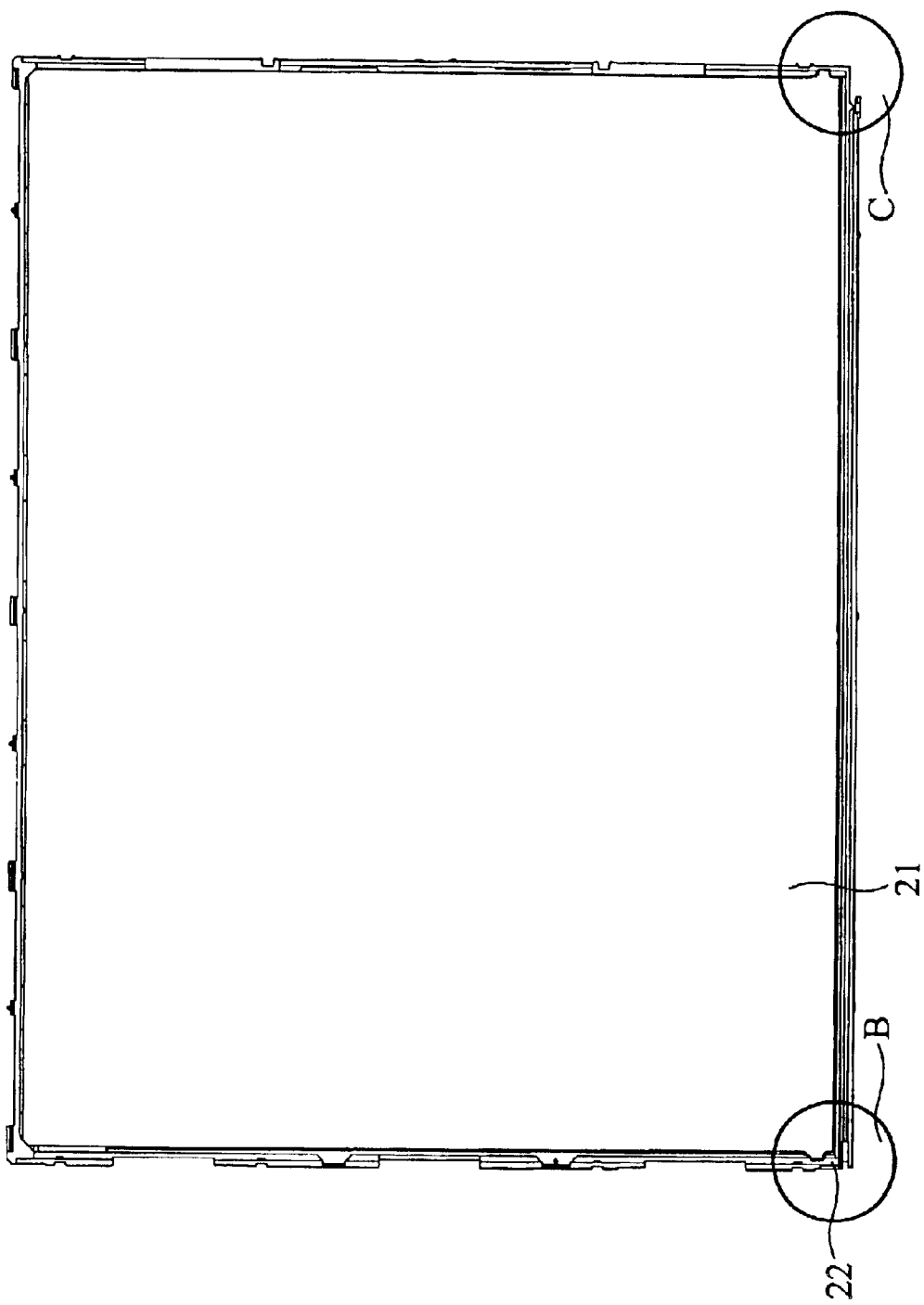
FIG. 2a is a schematic view of another conventional backlight module.
Figure 2B:
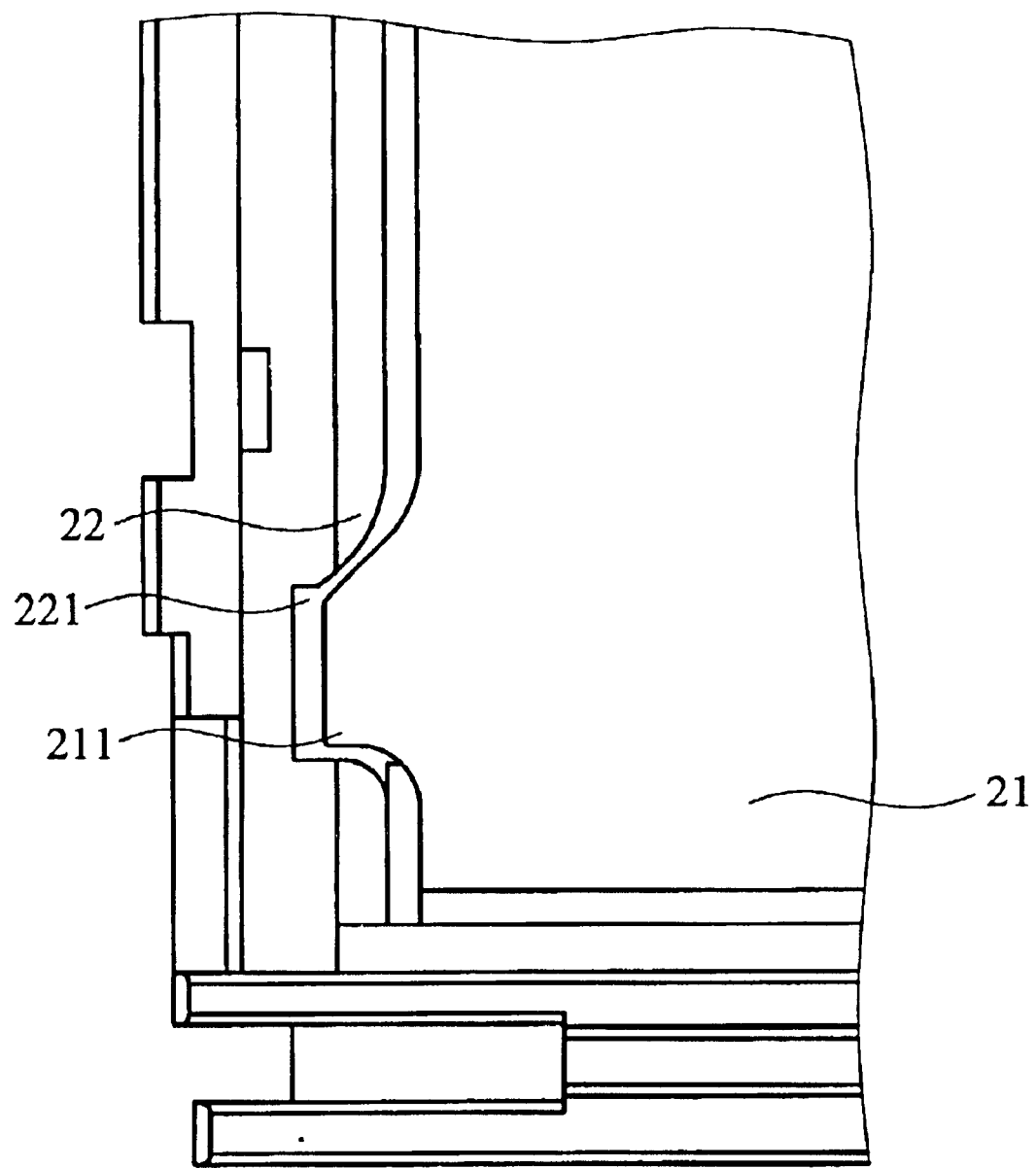
Figure 2C:
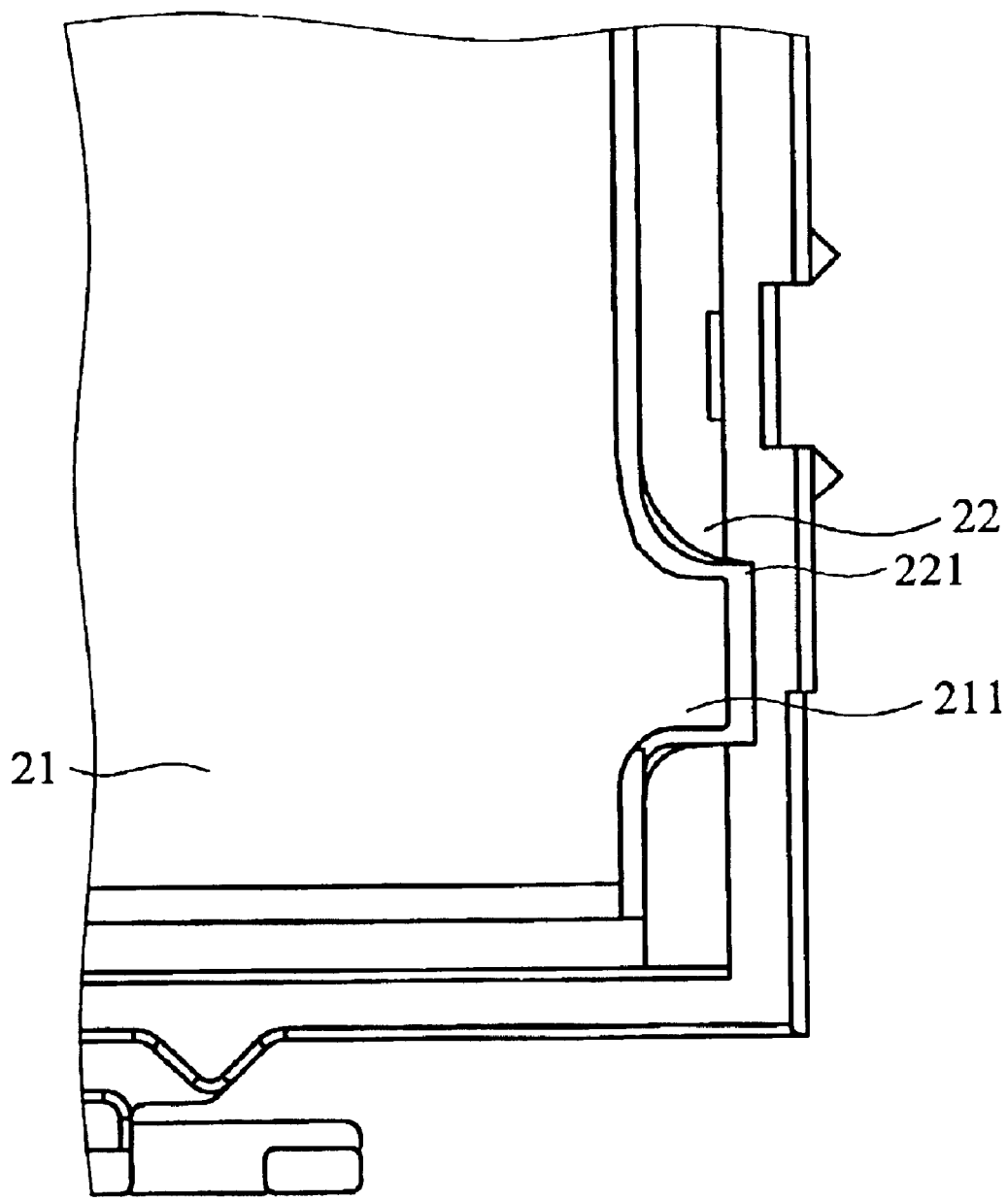
Figure 3:
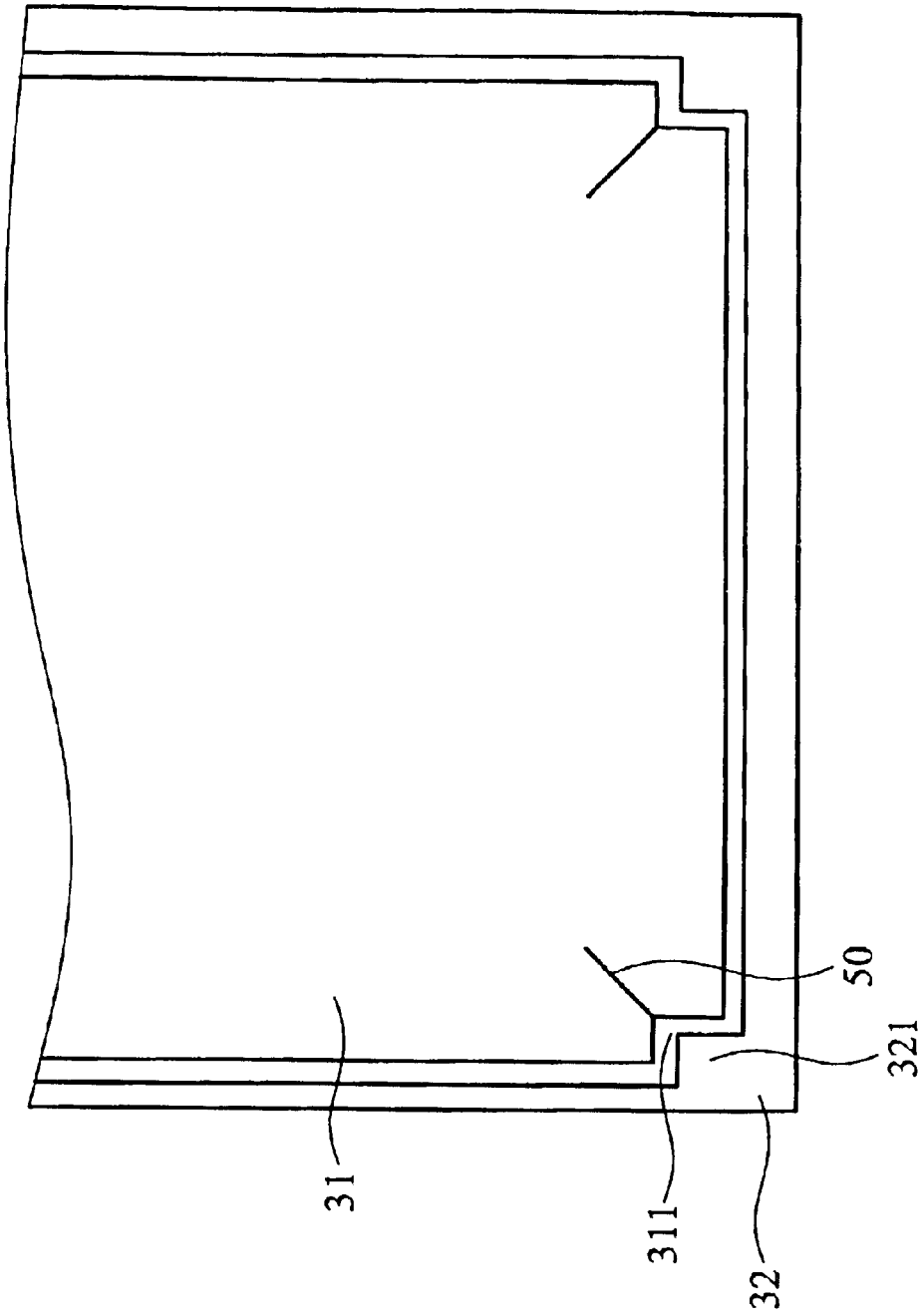
FIG. 3 is a schematic view of another conventional backlight module.
Figure 4A:
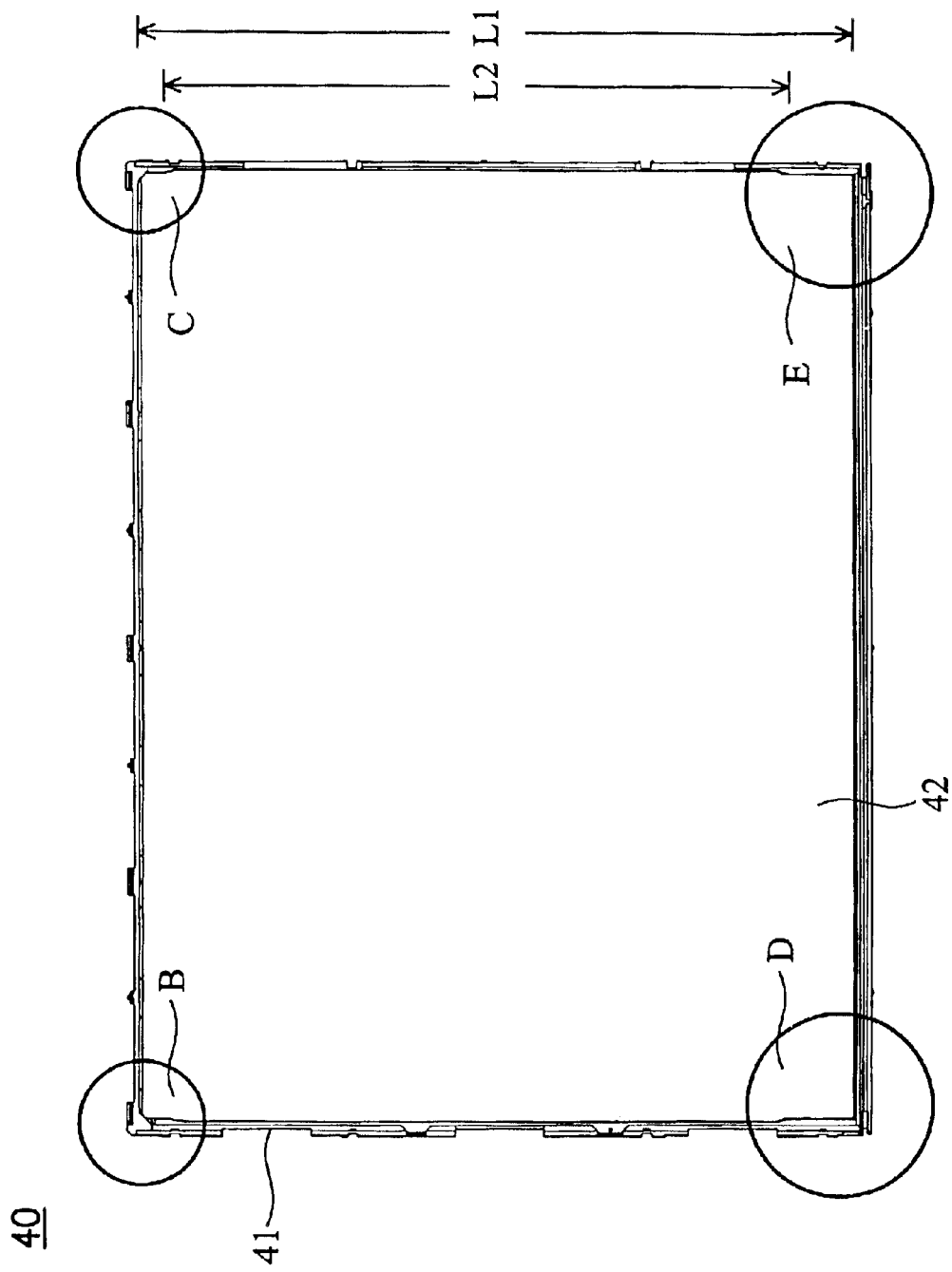
FIG. 4a is a schematic view of a backlight module as disclosed in this invention.

Referring to FIG. 4a, a backlight module as disclosed in this invention is applied for a liquid crystal display panel module. The backlight module 40 comprises a hollow frame 41 and a light guide plate 42.

Figure 4B:
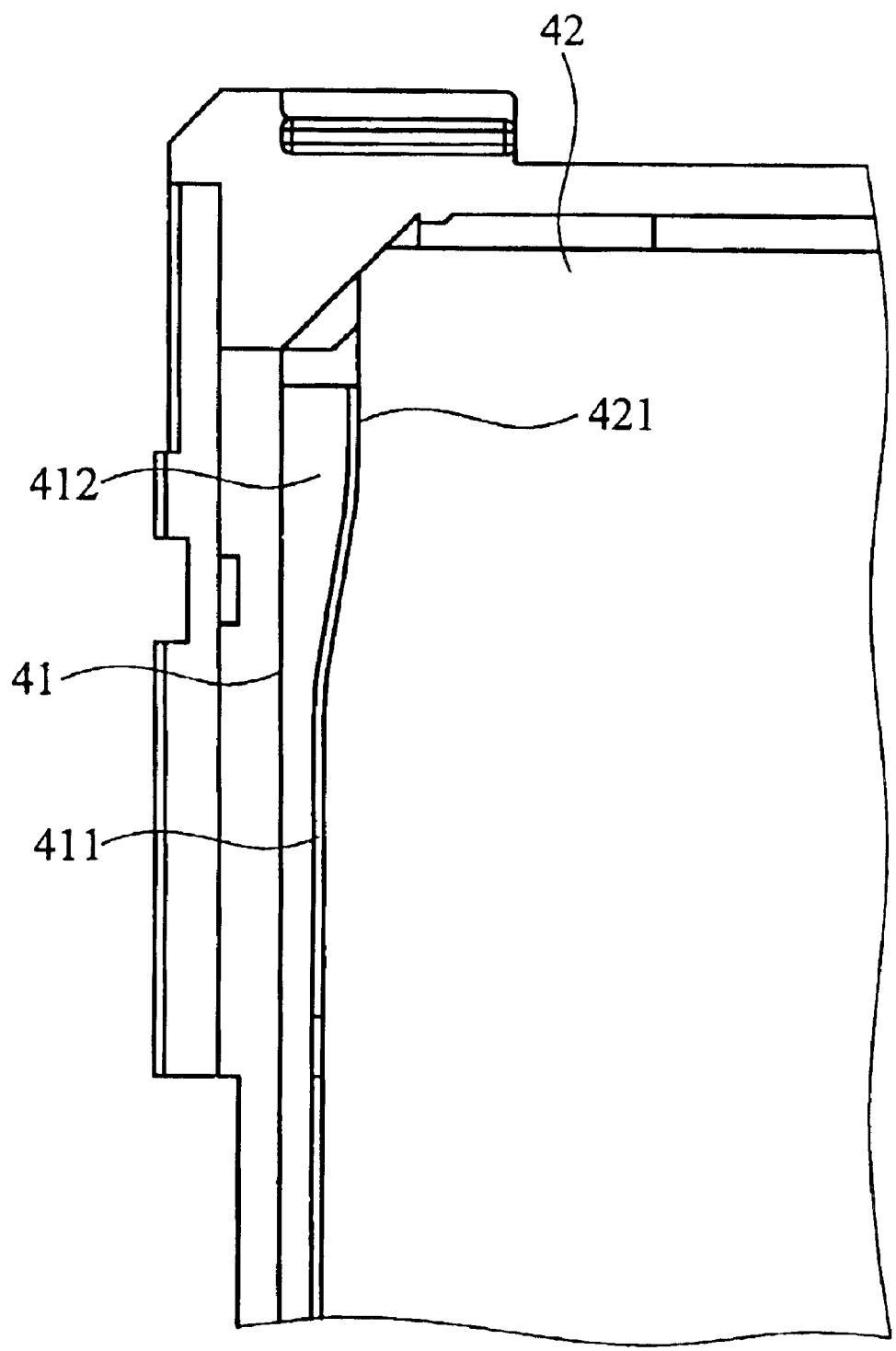
Figure 4C:
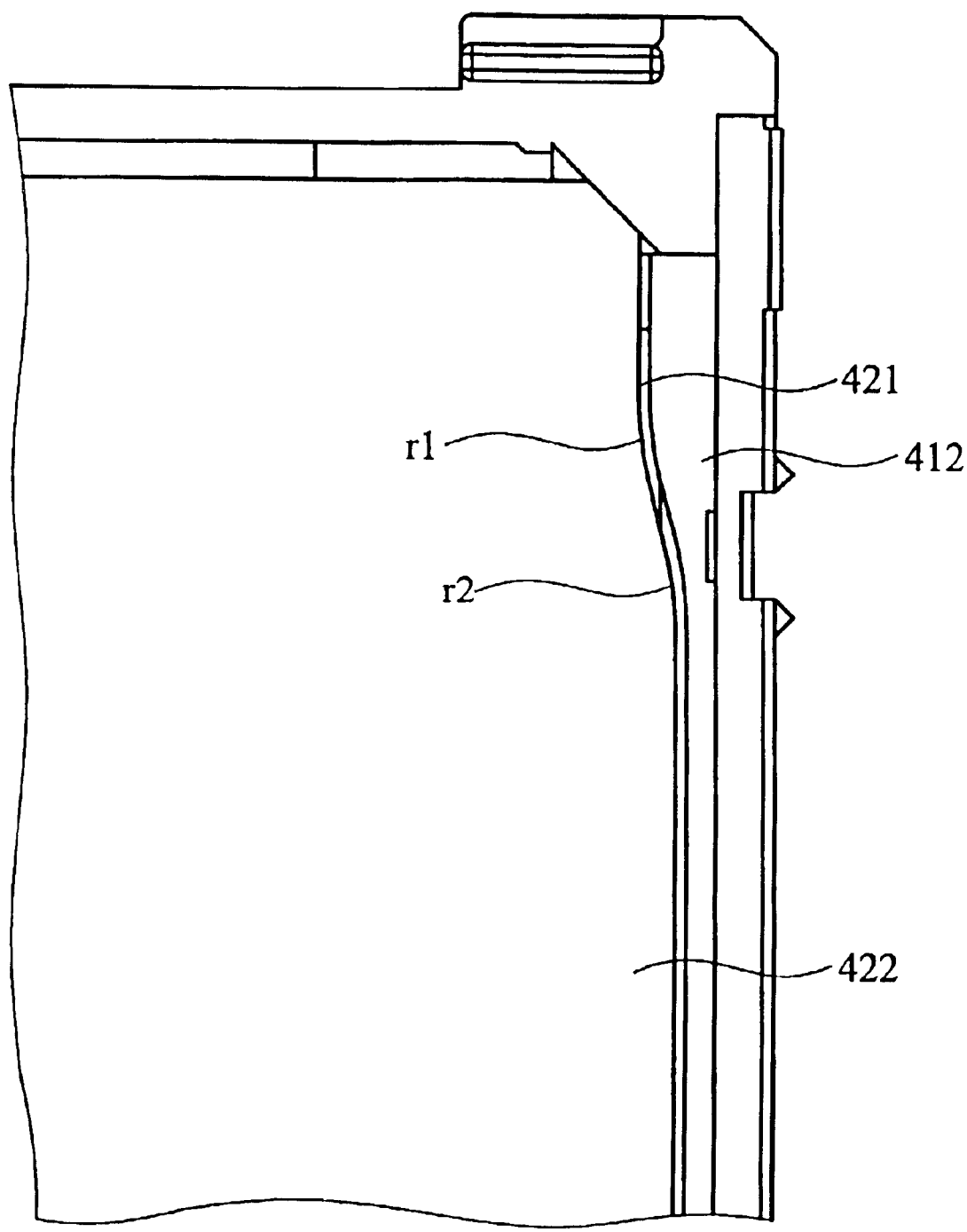
Figure 4D:
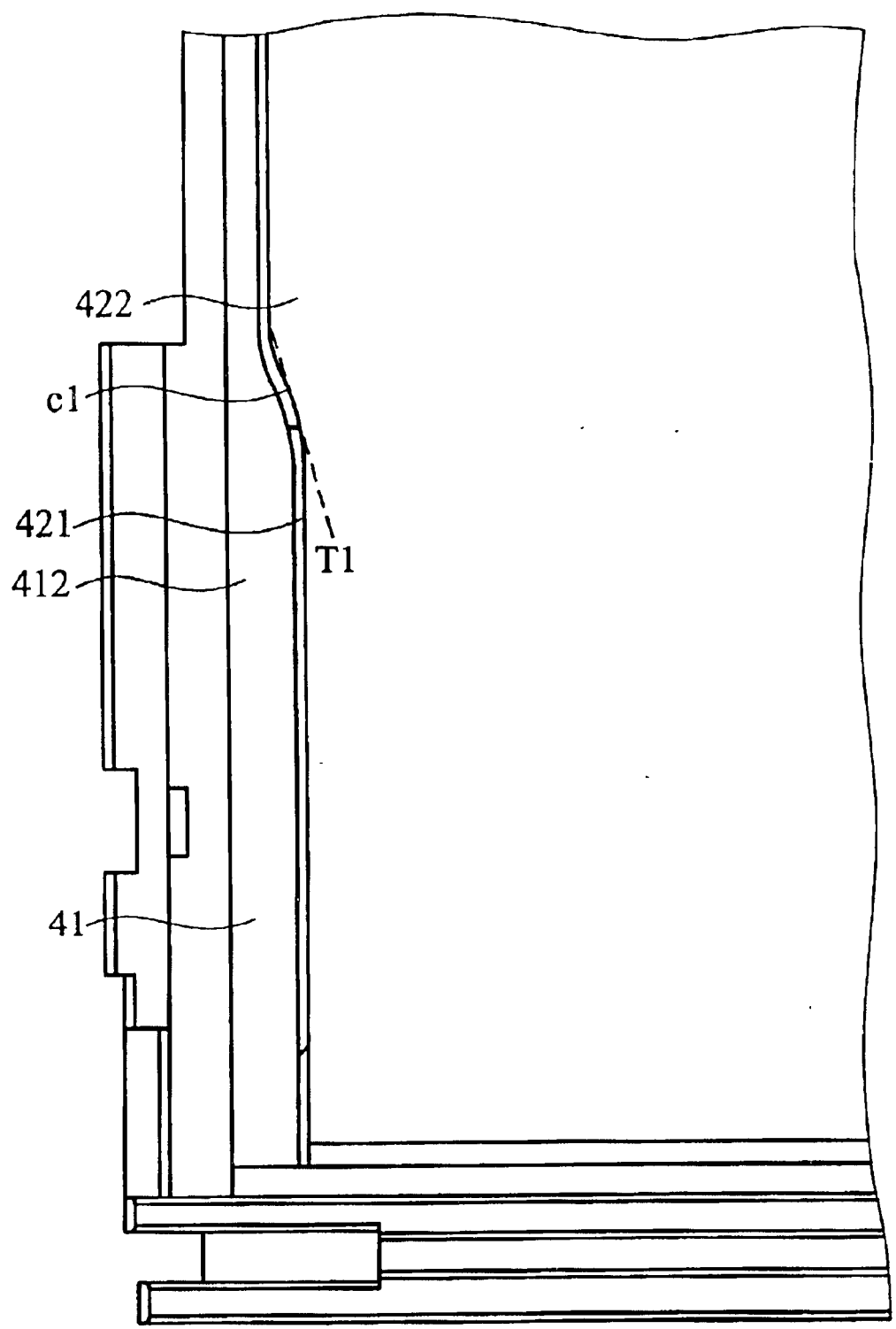
Figure 4E:
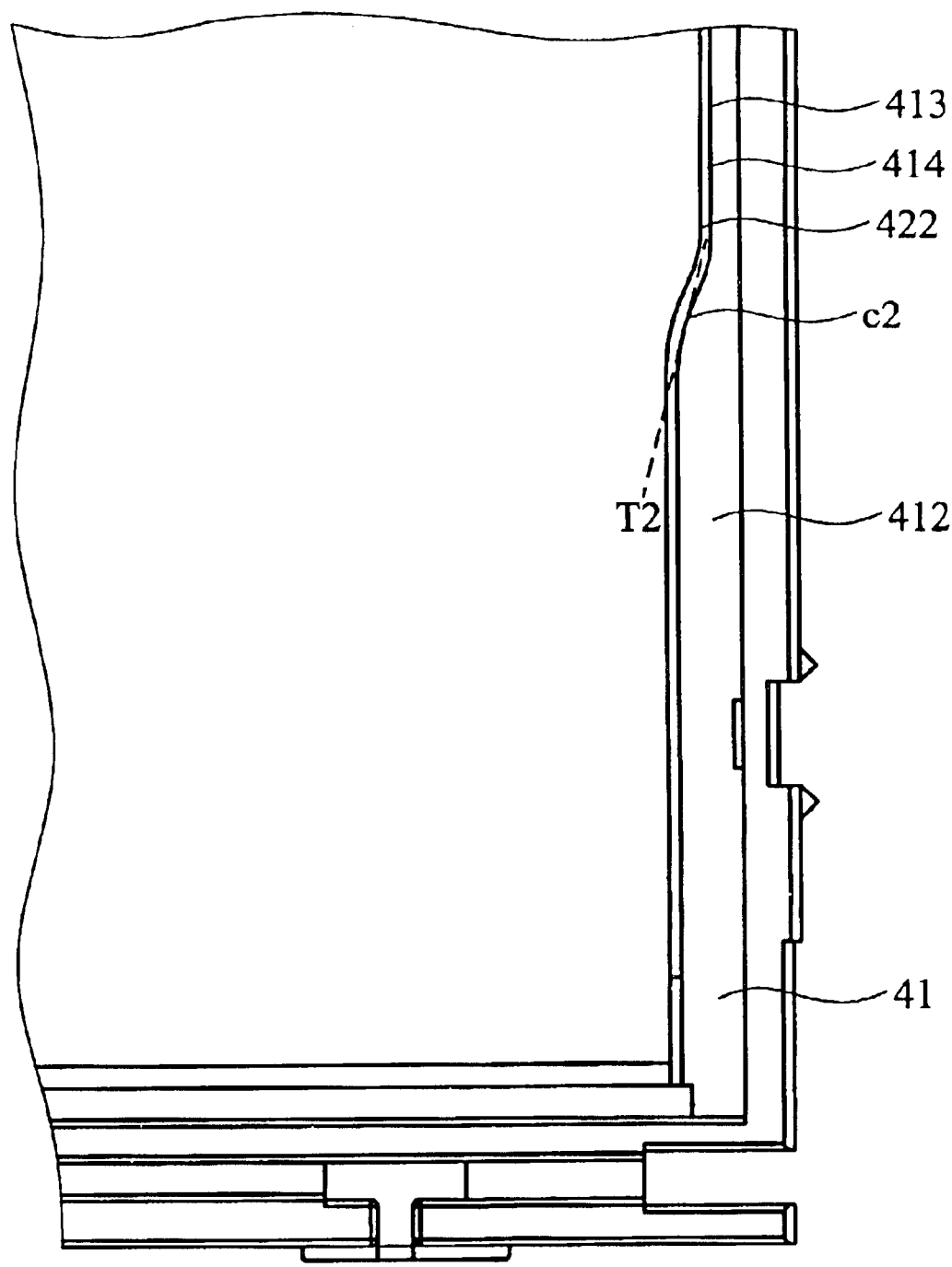

As shown in FIG. 4b and FIG. 4e, the hollow frame 41 includes a hollow portion 411 at its center so as to form an inner periphery 413. The hollow frame 41 includes a plurality of first protrusions 412, projecting inwardly, at its corners. In addition, the hollow frame 41 is formed with two first concave portions 414 at left and right edges of the inner periphery 413 respectively. That is, the hollow frame 41 is provided with one first concave portion 414 and two first protrusions 412 at the left edge of the inner periphery 413, and the hollow frame 41 is also provided with one first concave portion 414 and two first protrusions 412 at the right edge of the inner periphery 413. Specifically, the first protrusions 412 are located at the top portion and the bottom portion of the right edge and the left edge of the inner periphery 413. The first concave portions 414 are located at the central portion of the right edge and the left edge of the inner periphery 413, and are adjacent to the first protrusions 412.

Referring to FIG. 4a, FIG. 4b, FIG. 4c, FIG. 4d, and FIG. 4e, the light guide plate 42 includes two second concave portions 421 and a second protrusion 422 at its right side and left side respectively. Each of the second concave portions 421 corresponds to the first protrusion 412 of the frame 41, and each of the second protrusions 422 corresponds to the first concave portion 414 of the frame 41. That is, the second concave portions 421 are located at the top portion and the bottom portion of the right side and the left side of the light guide plate 42. The second protrusions 422 are located at the central portion of the right side and the left side of the light guide plate 42, and are adjacent to the second concave portions 421. The light guide plate 42 is stably disposed in the hollow frame 41 in a manner such that the first protrusions 412 of the hollow frame 41 engage with the second concave portions 421 of the light guide plate 42. That is, when the light guide plate 42 is disposed in the hollow frame 41, the second protrusions 422 of the light guide plate 42 are engaged with the first concave portions 414 of the hollow frame 41.

It is noted that the contact area between the second protrusions 422 of the light guide plate 42 and the first concave portions 414 of the hollow frame 41 must have a certain size so as to fix the light guide plate 42 in the hollow frame 41. Referring to FIG. 4a, a length L2 of the second protrusion 422 is substantially larger than a quarter of a length L1 of the left side or the right side of the light guide plate 42. Preferably, the length L2 of the second protrusion 422 may be substantially equal to half of the length L1 of the left side or the right side of the light guide plate 42.

In addition, referring to FIG. 4c, the light guide plate 42 includes a curved surface c1 connecting the second protrusion 422 and the second concave portion 421 so as to form a rounded corner r1 on the second concave portion 421 and a rounded corner r2 on the second protrusion 422. Furthermore, a tangent T1 of the curved surface c1 intersects the frame 41 at an angle substantially less than forty-five degrees as shown in FIG. 4d. Similarly, the hollow frame 41 includes a curved surface c2 connecting the first protrusion 412 and the first concave portion 414, and a tangent T2 of the curved surface c2 intersects the inner periphery 413 of the frame 41 at an angle substantially less than forty-five degrees as shown in FIG. 4d.

It is understood that the hollow frame 41 may be made of plastic.

As stated above, the light guide plate 42 is provided with a concave portion at each corner, with as much contact area between the light guide plate and the hollow frame as possible. Thus, during a shock, unlike the conventional structure, the applied force can be distributed over a larger area to bear the applied force. As a result, the light guide plate is not broken or cracked, and the backlight module can maintain its image quality.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A backlight module comprising:

a hollow frame including at least one first protrusion that projects inwardly; and a light guide plate, including at least one concave portion at a side of the light guide plate corresponding to the first protrusion and a second protrusion at the side of the light guide plate, disposed in the hollow frame in a manner such that the first protrusion engages with the concave portion, wherein the second protrusion is substantially longer than a quarter of the length of the side of the light guide plate, and corners of the second protrusion are rounded.

2. The backlight module as claimed in claim 1, wherein the length of the second protrusion is substantially equal to half of the length of the side of the light guide plate.

3. The backlight module as claimed in claim 1, wherein the light guide plate includes a curved surface connecting the second protrusion and the concave portion.

4. The backlight module as claimed in claim 4, wherein a tangent of the curved surface intersects the frame at an angle substantially less than forty-five degrees.

5. The backlight module as claimed in claim 1, wherein the frame is made of plastic.

6. A backlight module comprising:

a hollow frame including at least one concave portion inside the hollow frame; and a light guide plate, including at least one protrusion at a side of the light guide plate corresponding to the concave portion, disposed in the hollow frame in a manner such that the protrusion engages with the concave portion, wherein the protrusion is substantially longer than a quarter of the length of the side of the light guide plate.

7. The backlight module as claimed in claim 6, wherein the length of the protrusion is substantially equal to half of the length of the side of the light guide plate.

8. The backlight module as claimed in claim 6, wherein corners of the protrusion are rounded.

9. The backlight module as claimed in claim 6, wherein the frame is made of plastic.

* * * * *